United States Patent [19]
Chang

[11] Patent Number: 5,769,515
[45] Date of Patent: Jun. 23, 1998

[54] OPTICAL SCANNERS WITH AN IMPROVED CHASSIS LOCKING MEANS

[75] Inventor: Yao-Wen Chang, Miaoli, Taiwan

[73] Assignee: Umax Data Systems, Inc., Hsinchu, Taiwan

[21] Appl. No.: 773,723

[22] Filed: Dec. 16, 1996

[51] Int. Cl.$^6$ ..................................................... A47B 81/00
[52] U.S. Cl. ........................ 312/223.2; 292/209; 361/726
[58] Field of Search ............................... 312/223.2, 215, 312/222; 361/724, 726, 740, 747, 759; 292/209, 214, 218

[56] References Cited

U.S. PATENT DOCUMENTS

| | | | |
|---|---|---|---|
| 2,529,478 | 11/1950 | Bach | 292/218 |
| 4,643,710 | 2/1987 | Troutner | 292/214 X |
| 4,736,972 | 4/1988 | Mosch | 292/209 X |
| 5,446,618 | 8/1995 | Tetsuya et al. | 361/726 X |
| 5,465,191 | 11/1995 | Nomura et al. | 361/747 X |

*Primary Examiner*—Peter M. Cuomo
*Assistant Examiner*—James O. Hansen
*Attorney, Agent, or Firm*—W. Wayne Liauh

[57] ABSTRACT

An optical scanner with an improved chassis locking mechanism. The improved chassis locking mechanism includes a chassis, a latch disk, a scanner case and a cover. The latch disk has a shaft for turnably resting on a rack of the scanner case and being held from falling off the rack by a pair of brackets of the cover. The latch disk also has a limiting bulge for limiting the turning angle of the latch disk and a plurality of positioning notches formed on the circumference thereof. The latch disk further has a locking slot for receiving or locking a strut ofthe chassis. By turning the latch disk to a predetermined angle, one of the positioning notches will be engaged with a positioning bulge on the scanner case. The locking slot of the latch disk will either allow the strut to move freely or lock the strut from moving so that the chassis can be held stationary during transportation to reduce damage that might otherwise occur.

5 Claims, 3 Drawing Sheets

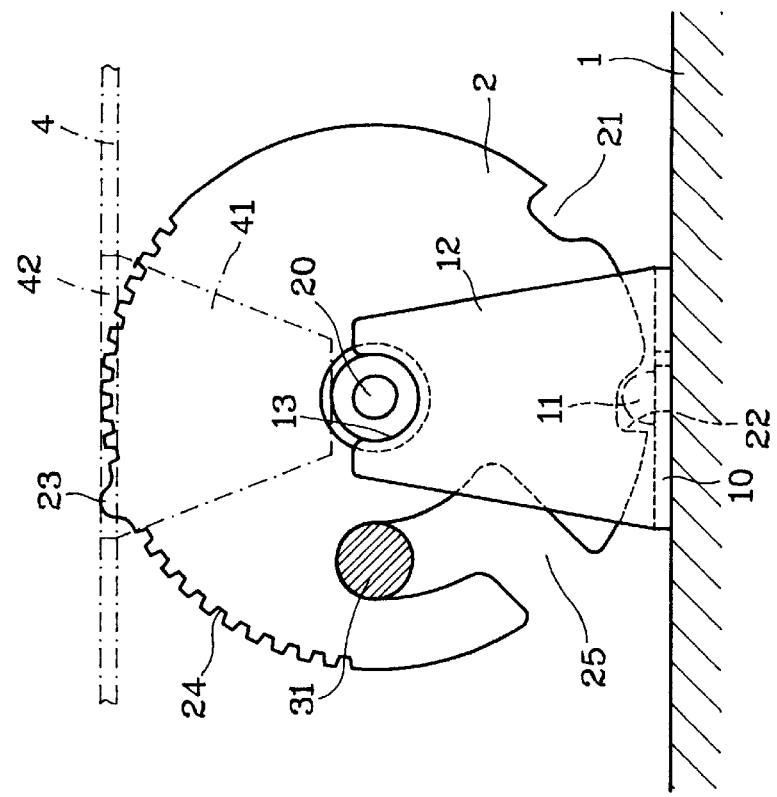
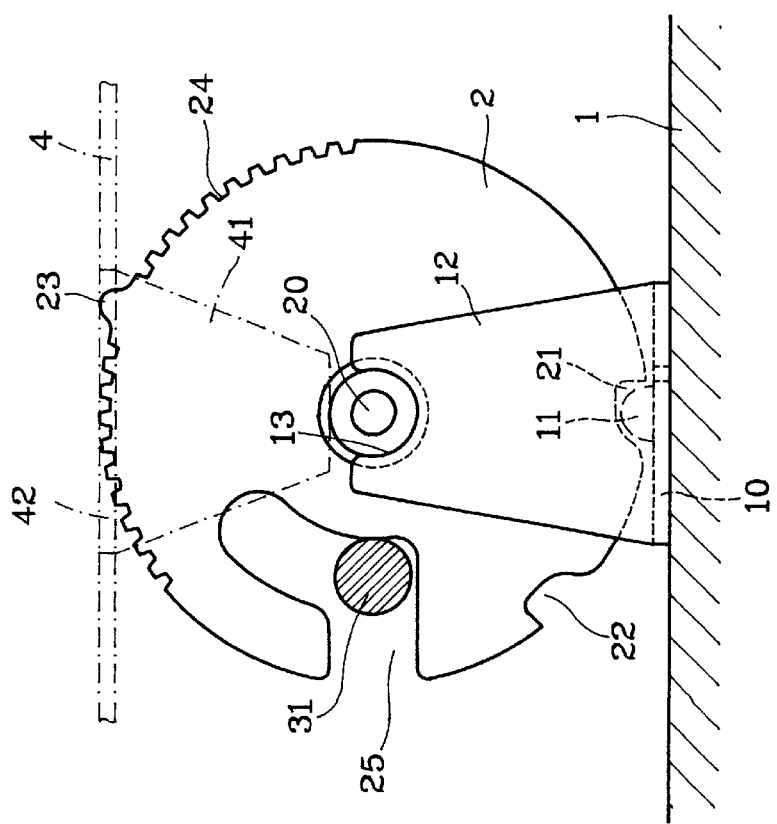
FIG. 4
FIG. 5

OPTICAL SCANNERS WITH AN IMPROVED CHASSIS LOCKING MEANS

BACKGROUND OF THE INVENTION

1. Field of the invention

The present invention relates to an optical scanner with an improved chassis locking means, and, more particularly, to an improvement in a rotary and manual chassis locking means which can rapidly lock or release the chassis of an optical scanner.

2. Description of the Prior Art

In an optical scanner the chassis is a very important and expensive sub-assembly as it carries the lamp set, reflection means, lens set and Charge-Coupled Device (CCD). During scanning operation, the chassis should remain movable. However, during transportation of the scanner, the chassis should be locked stationary to avoid vibration or impact force of movement in damaging the parts located therein. Therefore conventional optical scanner usually has a locking means for this purpose. FIGS. 1 and 2 show a typical locking means used in a scanner. It generally has a screw hole B formed in one side of the chassis A. There is a bracket D attached to the case C for holding a knob G to mate and engage with the screw hole B through an external thread F of the stem of the knob G. The stem of the knob G passes through the opening E formed on the case C and the bracket D. There is a compression spring H to keep the stem of the knob G away from the screw hole B of the chassis A when the scanner is in use state. The stem has a ring I on another side of the spring H for preventing the knob G from falling off from the case C. The locking means set forth above includes a lot of components. It is costly to make and to assemble. Moreover, the knob G is usually marked with "Lock" and "Unlock" on the outside for user instruction. User often being misled to turn the knob G by a halfturn for locking or unlocking of the chassis A while the chassis A actually remains unlocked. Because the knob G has to be turned a number of times before it can securely screwed in the chassis A through the screw hole B, therefore the chassis A and the components disposed thereon could easily get damage resulting from the impact force occurred in the transportation, as the chassis remains disengaged with knob G when a user wrongly turning the knob G a half turn.

SUMMARY OF THE INVENTION

In view of aforesaid disadvantage, it is therefore an object of this invention to provide an improvement of chassis locking means which can lock or release the chassis more effectively without human error or negligence. It is also simple in structure and costs less in production and assembly.

The other object of the present invention is to provide an improvement of chassis locking means, which includes a latch disk which has a locking slot, positioning notches and a limiting bulge. The latch disk can easily and effectively lock or release the chassis by a user with simple operation. This invention also has simple structure and uses a small number of components. Most of the parts are built in the case and the chassis. Therefore the production and assembly cost can be reduced.

BRIEF DESCRIPTION OF THE DRAWINGS

The invention, as well as its many advantages, may be further understood by the following detailed description and drawings in which.

FI3. 3 is an exploded view of this invention.

FIG. 4 is a e view of this invention in unlocking state.

FIG. 5 is a side view of this invention in locking state.

DETAILED DESCRIPTION OF THE PREFERRED EMBODIMENT

Figure 2:
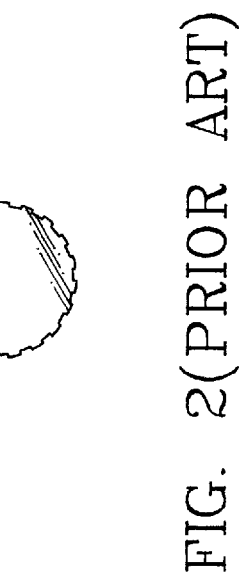
FIG. 2 is a side view of a knob shown in FIG. 1.
Figure 1:
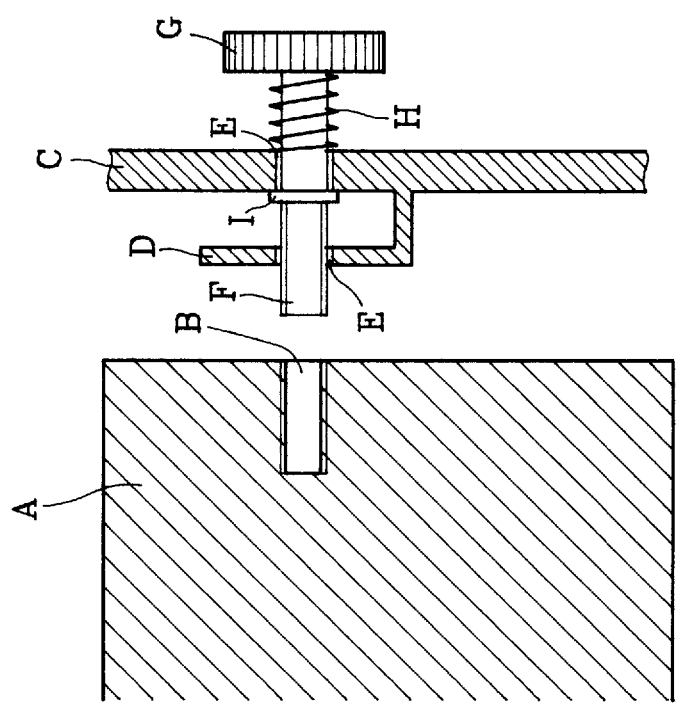
FIG. 1 a sectional view of a locking means used in a conventional optical scanner.
Figure 3:
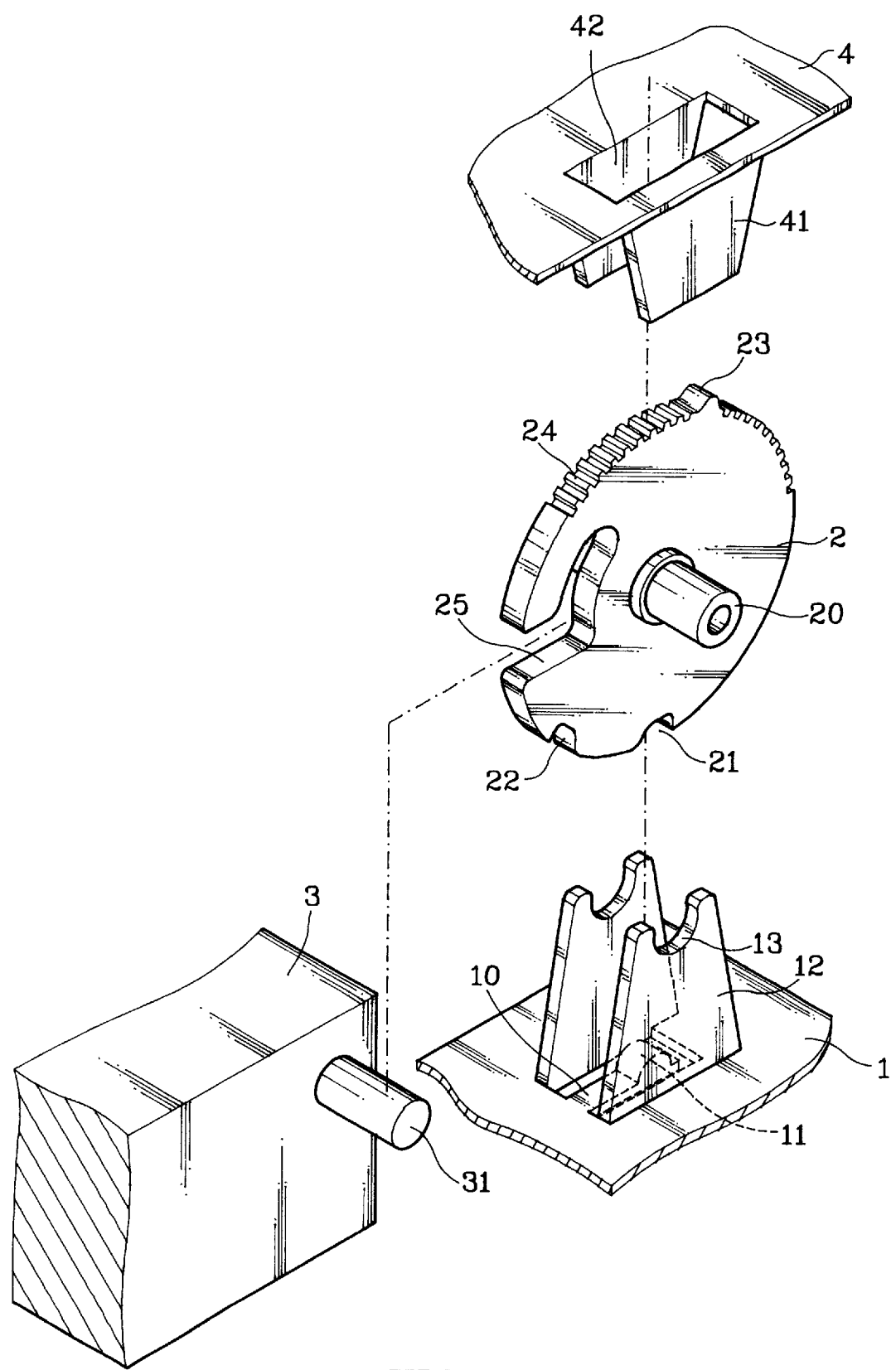

Referring to FIGS. 3, this invention includes a scanner case 1, a scanner cover 4, a latch disk 2 and a chassis 3. The bottom surface of the scanner case 1 is equipped with a U-shaped rack 12 with two semicircular grooves 13 formed on the top of the rack 12. Formed at the base of the rack 12 is a spring plate 10 which has a positioning bulge 11 substantially formed in the middle of the U-shaped rack 12. The cover 4 has a rectangular opening 42 and a pair of spaced brackets 41 positioned right above the U-shaped rack 12 (also shown in FIG. 4). The latch disk 2 is in general a circular disk with a horizontal shaft 20 for turnably resting on the grooves 13 and being held from falling off by the bottom end of the brackets 41. The latch disk 2 also has a first positioning notch 21 and a second positioning notch 22 formed on the circumference. On the circumference opposite to the first positioning notch 21, there is a limiting bulge 23 and teethed edge 24 formed on the two extended sides of the circumference from the limit bulge 23. The latch disk 2 further has a curved locking slot 25 formed therein. The locking slot 25 has an opening leading to the circumference.

FIG. 4 shows this invention in use state. The first positioning notch 21 engages with the positioning bulge 11 and making the latch disk 2 resting on the rack 12 stationary. The chassis 3, which has a sideward extended strut 31, can be freely moved in or out of the opening of the slot 25 of the latch disk 2. This is a position for normal scanner operation.

When the scanner is powered off and to be moved to some other place, the latch disk 2 is turned counter clockwise until the second positioning notch 22 engaging with the positioning bulge 11. At that position, the curved locking slot 25 latches and locks the strut 31 of the chassis 3 securely. Therefore the chassis 3 cannot be moved freely. Teeth 24 is to enable a user to use hand and fingers to grip the latch disk 2 to turn as desired without slipping. The limiting bulge 23 limits the latch disk 2 to turn within the boundary of the opening 4.

It thus can be seen that this invention can easily and effectively lock or release the chassis with simple operation. The structure is simple. The production and assembly is easy and less expensive than the conventional one.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. An optical scanner with an improvement of locking means, comprising.

a chassis having a strut extending sideward;

a scanner case having a U-shaped rack located on a bottom surface of said scanner case, the rack having two semi-circular grooves formed on a top of said rack;

a cover having a rectangular opening and a pair of spaced brackets which are positioned right above said rack; and a latch disk being substantially a circular disk with a horizontal shaft for turnably resting on said semi-circular grooves of said rack, said latch disk having a limiting bulge movable within the boundary of said opening of said cover, and a locking slot allowing said strut of said chassis to be freely moved away from said latch disk when the scanner being operative, and causing said strut to be locked from moving when said latch disk is turned to a predetermined angle.

2. The optical scanner with an improvement of locking means of claim 1, wherein said scanner case has a spring plate with a positioning bulge located at a base of said rack engageable with one of a plurality of positioning notches formed on a circumference of said latch disk.

3. The optical scanner of claim 2, wherein said positioning bulge on the scanner case can be engaged with one of said positioning notches when said limiting bulge on said latch disk is moved from one edge of the opening of said cover to an opposite edge of said cover.

4. The optical scanner of claim 1, wherein the locking slot of said latch disk is curved and is extending to said circumference of said latch disk for receiving said strut of said chassis.

5. The optical scanner of claim 1, wherein said circumference of said latch disk has a teethed surface on both sides of said limiting bulge.

\* \* \* \* \*